US009850848B2

United States Patent
Kira (10) Patent No.: US 9,850,848 B2
(45) Date of Patent: Dec. 26, 2017

(54) SENSOR SUPPORT STRUCTURE FOR CAMSHAFT ROTATION SENSOR

(71) Applicant: AISIN SEIKI KABUSHIKI KAISHA, Kariya-shi, Aichi (JP)

(72) Inventor: Naoki Kira, Nagoya (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 77 days.

(21) Appl. No.: 14/911,654

(22) PCT Filed: Jul. 31, 2014

(86) PCT No.: PCT/JP2014/070173
§ 371 (c)(1),
(2) Date: Feb. 11, 2016

(87) PCT Pub. No.: WO2015/029687
PCT Pub. Date: Mar. 5, 2015

(65) Prior Publication Data
US 2016/0195037 A1    Jul. 7, 2016

(30) Foreign Application Priority Data
Aug. 30, 2013 (JP) .................................. 2013-180081

(51) Int. Cl.
*F02F 7/00* (2006.01)
*F01L 1/46* (2006.01)
(Continued)

(52) U.S. Cl.
CPC ............ *F02F 7/0068* (2013.01); *F01L 1/047* (2013.01); *F01L 1/053* (2013.01); *F01L 1/46* (2013.01);
(Continued)

(58) Field of Classification Search
CPC ...... G01M 15/042; F02F 7/006; F02F 7/0068; F01L 1/047; F01L 1/053; F01L 1/46;
(Continued)

(56) References Cited

U.S. PATENT DOCUMENTS 6,293,244 B1    9/2001  Mullins
2003/0019450 A1*  1/2003  Katayama ................. F01L 1/34
123/90.17

(Continued)

FOREIGN PATENT DOCUMENTS

JP    2006-220073 A    8/2006
JP    2007-107387 A    4/2007
(Continued)

OTHER PUBLICATIONS

Notification of Transmittal of Translation of the International Preliminary Report on Patentability (Forms PCT/IB/338 and PCT/IB/373) and the Written Opinion of the International Searching Authority (Form PCT/ISA/237) dated Mar. 10, 2016, by the International Bureau of WIPO in corresponding International Application No. PCT/JP2014/070173. (6 pgs).

(Continued)

*Primary Examiner* — David Bolduc
(74) *Attorney, Agent, or Firm* — Buchanan Ingersoll & Rooney PC (57) ABSTRACT

A sensor support structure includes a connection portion positioned in the cylinder head cover of an internal combustion engine from an outer surface of the cylinder head cover to a position where the connection portion comes in contact with a cylinder head of the internal combustion engine, an arm portion extending from an outer end side of the connection portion toward an outer side of the connection portion in a radial direction, a sensor support portion provided at an extending end of the arm portion, the sensor (Continued)

support portion being formed to protrude in a direction away from a side where the cylinder head is positioned, the sensor support portion supporting a sensor that detects a rotation of a camshaft of the internal combustion engine; and a restriction portion restricting a movement of the arm portion relative to the cylinder head cover in a circumferential direction about the connection portion.

4 Claims, 5 Drawing Sheets

(51) Int. Cl.
*F01L 1/053* (2006.01)
*F01L 1/047* (2006.01)
*G01M 15/04* (2006.01)

(52) U.S. Cl.
CPC .......... *F02F 7/006* (2013.01); *G01M 15/042* (2013.01); *F01L 2101/00* (2013.01); *F01L 2820/041* (2013.01)

(58) Field of Classification Search
CPC ............. F01L 2101/00; F01L 2820/041; F02L 2101/00; F02L 2820/041
See application file for complete search history.

(56) References Cited

U.S. PATENT DOCUMENTS

| | | | | |
|---|---|---|---|---|
| 2004/0154566 A1* | 8/2004 | Naito | ...................... | F01L 1/022 123/90.15 |
| 2004/0211376 A1* | 10/2004 | Mae | ........................ | F01L 1/047 123/90.6 |
| 2005/0076870 A1* | 4/2005 | Nakamura | .............. | F01L 1/022 123/90.27 |
| 2007/0017282 A1* | 1/2007 | Tooyama | ................ | F01L 1/053 73/114.26 |
| 2011/0119915 A1 | 5/2011 | Sanbyakuda et al. | | |

FOREIGN PATENT DOCUMENTS

| | | |
|---|---|---|
| JP | 2009-167809 A | 7/2009 |
| JP | 2010-001856 A | 1/2010 |
| JP | 2010-261361 A | 11/2010 |
| WO | WO 2006/085640 A1 | 8/2006 |

OTHER PUBLICATIONS

International Search Report (PCT/ISA/210) dated Oct. 14, 2014, by the Japanese Patent Office as the International Searching Authority for International Application No. PCT/JP2014/070173.

Written Opinion (PCT/ISA/237) dated Oct. 14, 2014, by the Japanese Patent Office as the International Searching Authority for International Application No. PCT/JP2014/070173.

* cited by examiner

SENSOR SUPPORT STRUCTURE FOR CAMSHAFT ROTATION SENSOR

TECHNICAL FIELD

The present invention relates to a sensor support structure that supports a sensor detecting a rotation of a camshaft.

BACKGROUND ART

Conventionally, a technology that detects a rotation of a camshaft being provided at an internal combustion engine has been used (for example, Patent document 1). According to the technology disclosed in Patent document 1, a fitting portion of a bracket is inserted into a cylinder head cover in a state where the bracket is positioned at an upper portion of the cylinder head cover, and is connected to a cam cap with a connection bolt. Moreover, a cam angle sensor detecting a rotation of a rotor of the camshaft is positioned so as to be inserted into the cylinder head cover, and a flange portion of the cam angle sensor is connected to the bracket.

According to the technology disclosed in Patent document 1, a position of the cam angle sensor is fixed relative to a cylinder head by a support of the cam angle sensor relative to the cam cap serving as a support portion of the camshaft via the bracket. As a result, even if the resin-made cylinder head cover is deformed by, for example, a thermal expansion, the relative positional relationship between the cam angle sensor and a rotor can be maintained optimally.

DOCUMENT OF PRIOR ART

Patent Document

Patent document 1: JP2009-167809A

OVERVIEW OF INVENTION

Problem to be Solved by Invention

Here, in a case where the sensor detecting the rotation of the camshaft that is positioned inside the cylinder head cover is assembled, the positioning of the sensor relative to the cam cap as disclosed in Patent document 1 is effective. However, because the cam cap is not provided over the whole area of the camshaft in an axial direction, the positional constraint occurs. Furthermore, according to a construction disclosed in Patent document 1, the construction in which the flange of the sensor is fixed to the bracket with a fixing bolt, the positional accuracy of the sensor may be decreased due to the change of the connection angle of the bracket and the flange at the fixing portion when seen from a direction along an axis of the fixing bolt.

The object of the present invention is, in a view of an aforementioned problem, to provide a sensor support structure that supports a sensor detecting the rotation of a camshaft with high precision.

Means for Solving Problem

A sensor support structure of this invention for achieving the above-mentioned purpose includes a connection portion being positioned in a cylinder head cover of an internal combustion engine from an outer surface of the cylinder head cover to a position where the connection portion comes in contact with a cylinder head of the internal combustion engine, an arm portion extending from an outer end side of the connection portion toward an outer side of the connection portion in a radial direction, a sensor support portion being provided at an extending end of the arm portion, the sensor support portion being formed to protrude in a direction away from a side where the cylinder head is positioned, the sensor support portion supporting a sensor that detects a rotation of a camshaft of the internal combustion engine, and a restriction portion restricting a movement of the arm portion relative to the cylinder head cover in a circumferential direction about the connection portion.

As in the present construction, because the connection portion is positioned so as to be in contact with the cylinder head, a mounting accuracy of the connection portion relative to the cylinder head can be enhanced. In addition, because the sensor can be held at the sensor support portion that is provided at the extending end of the arm portion extending from the connection portion, the mounting accuracy of the sensor relative to the cylinder head can be enhanced. Furthermore, the restriction portion can precisely set an orientation of the arm portion in the circumferential direction about the connection portion. Thus, the sensor detecting the rotation of the camshaft being positioned inside the cylinder head cover can be supported with high precision. When assembling the sensor, because the rotation of the arm portion about the connection portion can be restricted, the assembling can be easily accomplished.

Moreover, it is favorable that the restriction portion includes a protrusion being formed at one of the extending end of the arm portion and the cylinder head cover, and a recess being provided at the other of the extending end of the arm portion and the cylinder head cover, the recess being provided at a position facing the protrusion, the recess being formed in a long-hole shape along an extending direction of the arm portion.

As in the present construction, even in a case where there is a dimension error in the length of the arm portion in the extending direction of the arm portion relative to the connection portion, the protrusion can be engaged with the recess. Accordingly, the assembling of the sensor can be easily performed.

Furthermore, it is favorable that an axial direction of the connection portion is non-parallel to an extending direction of the sensor support portion.

As in the present construction, even in a case where there is a constraint on the mounting position of the sensor, the axial direction of the connection portion and the extending direction of the sensor support portion can be appropriately changed. Accordingly, the assembling of the sensor can be performed under the constraint.

MODE FOR CARRYING OUT THE INVENTION

Figure 1:
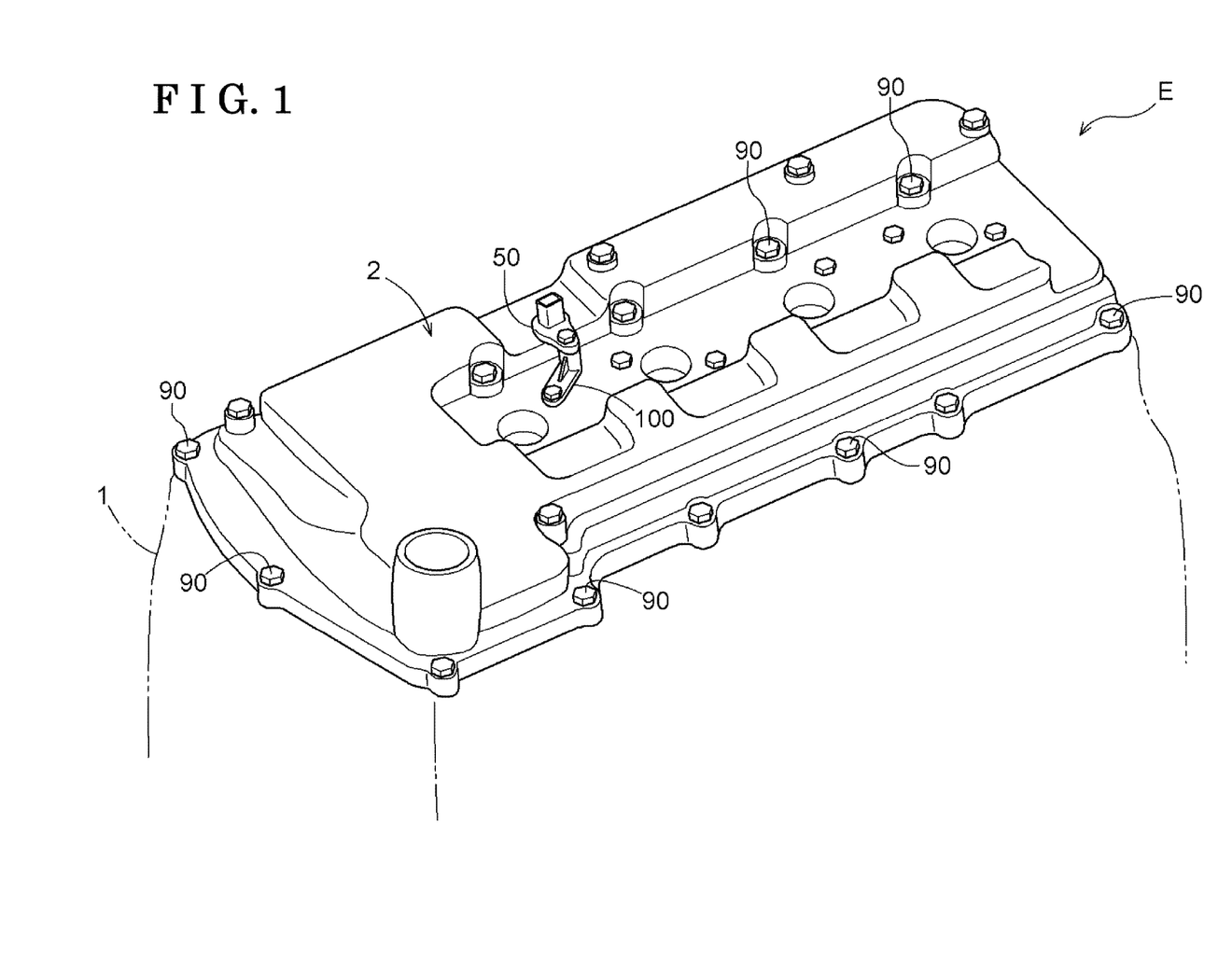
FIG. 1 is a perspective view of an internal combustion engine.
Figure 2:
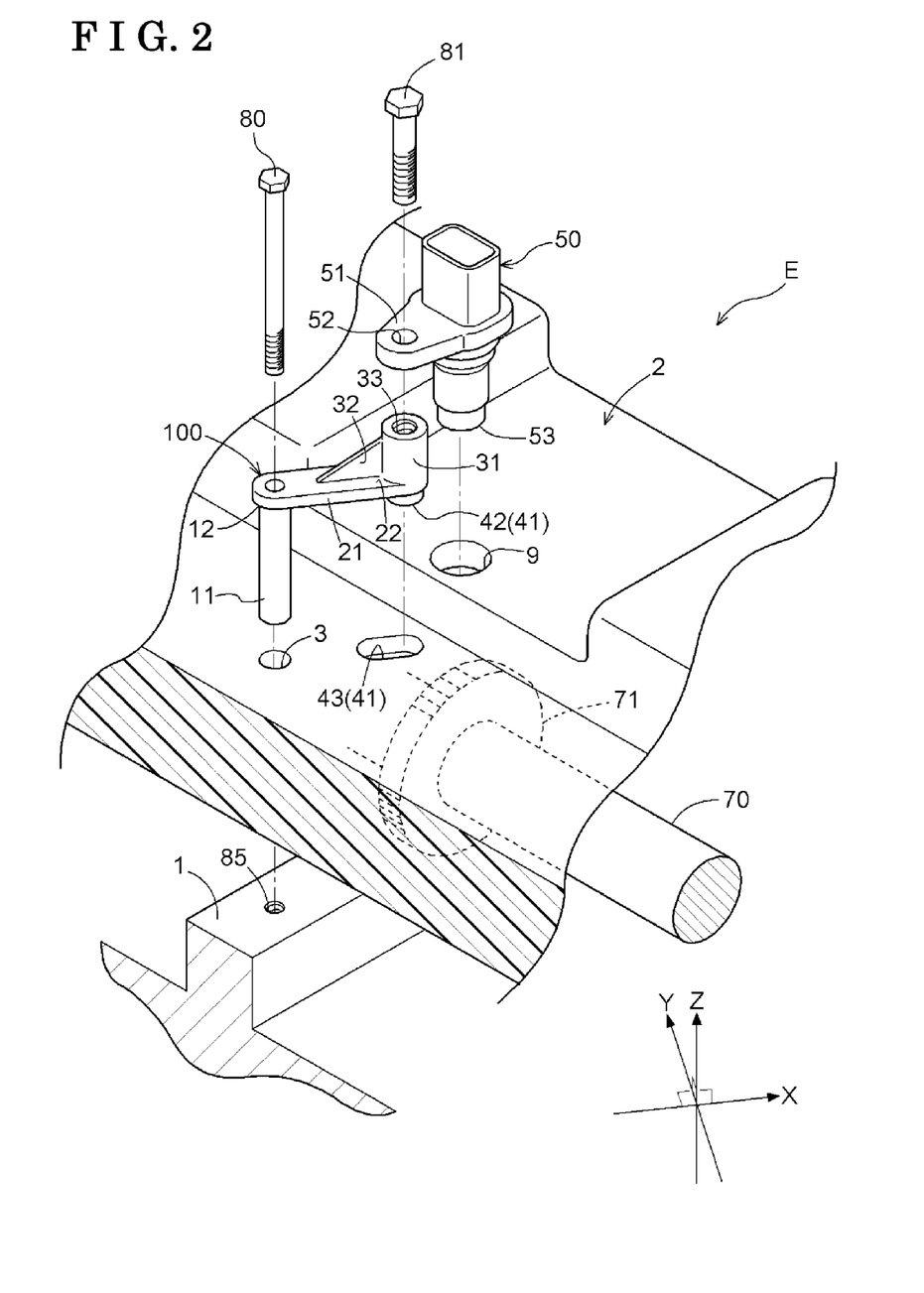
FIG. 2 is an exploded view of a sensor support structure.
Figure 3:
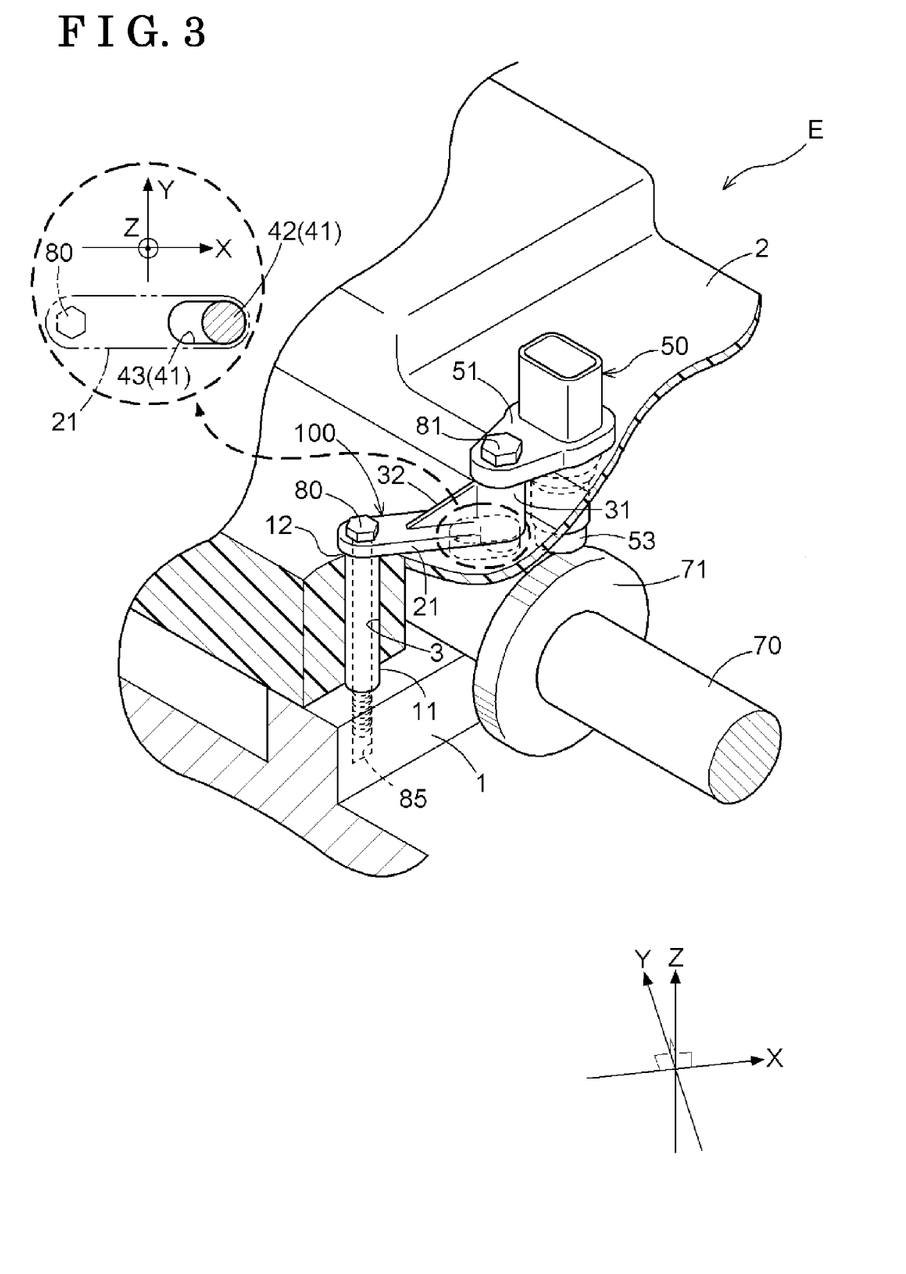
FIG. 3 is a view illustrating a sensor support structure that is in a mounted state on a cylinder head cover.

A sensor support structure according to the present invention is able to precisely support a sensor detecting a rotation of a camshaft that is contained by a cylinder head cover. Hereinafter, the sensor support structure of the present embodiment will be explained with reference to FIGS. 1 to 3. FIG. 1 is a perspective view of an internal combustion engine E. FIG. 2 is an exploded view of the sensor support structure. FIG. 3 illustrates the sensor support structure in a mounted state on a cylinder head cover 2.

As shown in FIG. 1, the internal combustion engine E includes a cylinder head 1 and a cylinder head cover 2. The cylinder head 1 is provided at an upper side of a cylinder block that contains a piston. The cylinder head cover 2 contains a camshaft 70 (see FIG. 2) and covers an opening portion of the cylinder head 1. The cylinder head 1 is made of metal and the cylinder head cover 2 is made of resin (for example, nylon 6, 6 (glass-filled). The cylinder head cover 2 is fastened and fixed to the cylinder head 1 with plural screws 90. Furthermore, a sensor 50 is supported at the cylinder head cover 2 by the use of the sensor support structure. The sensor 50 detects the rotation of the camshaft 70 of the internal combustion engine E. As shown below, the sensor 50 is positioned relative to the cylinder head 1 or a cam cap that specifies the position of a cam instead of the cylinder head cover 2 that is made of, for example, resin.

As shown in FIGS. 2 and 3, the sensor support structure is realized by including a connection portion 11, an arm portion 21, a sensor support portion 31, and a restriction portion 41. The connection portion 11 is inserted into the cylinder head cover 2 from an outer surface of the cylinder head cover 2 to a position where the connection portion 11 comes in contact with the cylinder head 1. The outer surface of the cylinder head cover 2 serves as a surface of the surface of the cylinder head cover 2, the surface exposed outside on the basis of the internal combustion engine E. The position where the connection portion 11 comes in contact with the cylinder head 1 serves as a position of a portion configuring the cylinder head 1 that is positioned at a lower portion of the cylinder head cover 2, the position where the connection portion 11 comes in contact with. Being inserted into the cylinder head cover 2 serves as an insertion so as to penetrate the cylinder cover head 2. Thus, a through hole 3 is provided at the cylinder head cover 2, the through hole 3 into which the connection portion 11 is penetratingly inserted.

Accordingly, the connection portion 11 is inserted into the through hole 3 that is provided at the cylinder head cover 2 so as to reach a portion configuring the cylinder head 1 from the exposed outer surface of the cylinder head cover 2. It is favorable that the connection portion 11 is made of metal (for example, iron or aluminum) and an outer diameter of the connection portion 11 is substantially the same as an inner diameter of the through hole 3. In such a case, the connection portion 11 can be press-fitted in and fixed to the through hole 3.

Here, according to the present embodiment, the connection portion 11 is made from a tubular member and is fixed to the cylinder head 1 via a screw 80 being inserted into an inner side of the tubular member in a radial direction. Therefore, a screw hole 85 is provided at a predetermined position of the cylinder head 1. Thus, the connection portion 11 can be easily and securely positioned relative to the cylinder head 1. Moreover, the screw 80 can be used in combination with a screw 90 that is used for fixing the cylinder head cover 2 to the cylinder head 1.

An arm portion 21 is provided to be extended from an outer end of the connection portion 11 toward an outer side of the connection portion 11 in the radial direction. The outer end of the connection portion 11 corresponds to an end portion 12 of the connection portion 11, the end portion 12 that is provided at a side where the outer surface of the cylinder head cover 2 is positioned. The outer side of the connection portion 11 in the radial direction corresponds to a direction extending to an axis of the connection portion 11 (an axis of the tubular member) along the radial direction. According to the present embodiment, the arm portion 21 is formed along a X direction in FIGS. 2 and 3. Thus, in a case where the arm portion 21 and the connection portion 11 are seen from a direction orthogonal to the arm portion 21 and the connection portion 11 (a Y direction in FIGS. 2 and 3), the arm portion 21 and the connection portion 11 are collectively formed in an L-shape. The arm portion 21 includes a width in the Y direction and a thickness in a Z direction until the shape is not changed in a case where an external pressure is applied. Similarly to the connection portion 11, the arm portion 21 is made of metal (for example, iron or aluminum).

A sensor support portion 31 is formed at an extending end 22 of the arm portion 21 and protrudes in a direction away from a side where the cylinder head 1 is positioned to support the sensor 50. The extending end 22 of the arm portion 21 corresponds to an end portion of opposing end portions of the arm portion 21, the end portion being provided opposite to a side where the arm portion 21 is connected to the connection portion 11. The direction away from the side where the cylinder head 1 is positioned corresponds to a direction opposite to an extending direction of the connection portion 11 that is connected to at least one end portion of the arm portion 21. That is, according to the present embodiment, because the cylinder head cover 2 and the cylinder head 1 are provided at a lower portion of the arm portion 21, the direction corresponds to a direction away from the cylinder head cover 2 and the cylinder head 1 that are positioned at the lower portion of the arm portion 21. The sensor support portion 31 is formed at the extending end 22 of the arm portion 21 and protrudes in such a direction. According to the present embodiment, the sensor support portion 31 is formed with a screw hole 33 along the Z direction. Similarly to the connection portion 11, the sensor support portion 31 is made of metal (for example, iron or aluminum).

Here, a rib 32 is formed to include a predetermined thickness and to be extended from the sensor support portion 31 to the arm portion 2. Thus, the stiffness of each of the sensor support portion 31 and the arm portion 21 can be enhanced. Accordingly, even in a case where the external pressure in different directions from each other is applied to each of the sensor support portion 31 and the arm portion 21, the positional relationship between the sensor support portion 31 and the arm portion 21 can be prevented from being displaced from each other.

The protruding direction (the Z direction) of the sensor support portion 31 and the extending direction (the X direction) of the arm portion 21 are formed orthogonal to each other. Thus, in a case where each of the sensor support portion 31 and the arm portion 21 are seen from a direction (the Y direction) orthogonal to each of the sensor support portion 31 and the arm portion 21, the sensor support portion 31 and the arm portion 21 are collectively formed in the L shape.

The sensor 50 is mounted on the sensor support portion 31. The sensor 50 is covered with a columnar resin material and is formed with a seat portion 51 being positioned at a center portion in the axial direction, the seat portion 51 that extends in the radial direction. The seat portion 51 is formed with a through hole 52. The sensor 50 is fastened and fixed to the sensor support portion 31 with a screw 81 in a state where the respective positions of the through hole 52 and of the screw hole 33 of the sensor support portion 31 are adjusted with each other. The sensor 50 is provided with a detection portion 53 so as to face a rotor 71 being provided at the camshaft 70 that is subject for determination. Thus, the sensor 50 is positioned such that a portion of the sensor 50 is inserted into the through hole 9 of the cylinder head 2, the through hole 9 being formed at a position facing the sensor 50.

According to the present embodiment, the sensor 50 is able to be fixed to the support portion 31 towards a direction where the rotor 71 is provided when seen from the axis of the sensor support portion 31. Accordingly, the extending direction of the seat portion 51 does not necessarily have to be in parallel with the extending direction (the X direction) of the arm portion 21, and does not necessarily have to be orthogonal to the extending direction (the X direction).

The restriction portion 41 restricts the movement of the arm portion 21 relative to the cylinder head cover 2 in the circumferential direction about the connection portion 11. As described above, according to the present embodiment, the connection portion 11 is made from the tubular member. Thus, the circumferential direction about the connection portion 11 corresponds to a rotary direction about the connection portion 11. Thus, the movement of the arm portion 21 corresponds to a rotation of the arm portion 21 about the connection portion 11.

According to the present embodiment, the restriction portion 41 includes a protrusion 42 and a recess 43. The protrusion 42 is formed at the extending end 22 of the arm portion 21. Here, as described above, the extending end 22 of the arm portion 21 protrudes to a direction away from a side where the cylinder head 1 is provided and is formed with the sensor support portion 31. The arm portion 21 is formed to protrude toward a direction different from the sensor support portion 31, that is, toward a side where the cylinder head cover 2 is provided. The protrusion 42 is made of a columnar metal (for example, iron or aluminum).

The recess 43 is provided at a position facing the protrusion 42 and is formed in a long-hole shape along the extending direction of the arm portion 21. The position facing the protrusion 42 of the cylinder head cover 2 corresponds to a position of the cylinder head cover 2 along the Z direction in FIGS. 2 and 3 from the protrusion 42 being provided at a side where the sensor support portion 31 is positioned. The extending direction of the arm portion 21 corresponds to the X direction in FIGS. 2 and 3. The recess 43 is provided such a position and is formed in a bottomed long-hole shape extending along the X direction. The width of the recess 43 (that is, the length in the Y direction) is formed substantially larger than an outer diameter of the recess 42. That is, in a case where the protrusion 42 is engaged with the recess 43, the movement in the Y direction (that is, the movement in the circumferential direction about the connection portion 11) is restricted. In such a case, the movement of the arm portion 21 is restricted relative to the cylinder head cover 2 that is positioned at the lower portion. Meanwhile, even in a case where there is a dimension error in the length of the arm portion 21 in the extending direction of the arm portion 21 relative to the connection portion 11, the protrusion 42 can be engaged with the recess 43. Accordingly, the assembling of the sensor 50 can be easily performed.

According to the present embodiment, the aforementioned connection portion 11, the arm portion 21, the sensor support portion 31, the rib 32, and the protrusion 42 are made of metal (for example, iron or aluminum) and are integrally molded. A sensor support body 100 is configured by the integrated molded product. Because the sensor support body 100 is integrally molded, a position from the cylinder head 1 that is in contact with the connection portion 11 to the sensor 50 that is supported by the sensor support portion 31 can be set precisely.

Furthermore, because the connection portion 11 is positioned so as to be in contact with the cylinder head 1, the connection portion 11 does not have to be provided at, for example, a vertically upper side of a cam cap supporting the camshaft 70, and can be provided at a position away from the cam cap. Thus, the flexibility in arrangement of the connection portion 11 is enhanced.

Another Embodiments

According to the aforementioned embodiment, the cylinder head cover 2 is explained to be made of resin. However, the applicability of this invention is not limited to this. Similarly to the cylinder head 1, the cylinder head cover 2 can be made of metal.

According to the aforementioned embodiment, the connection portion 11 is explained to be made from the tubular member. However, the connection portion 11 can be configured by a stick-shaped member that is not formed in the tubular shape. In such a case, the connection portion 11 can be fixed to the through hole 3 by being pressed in.

Figure 4:
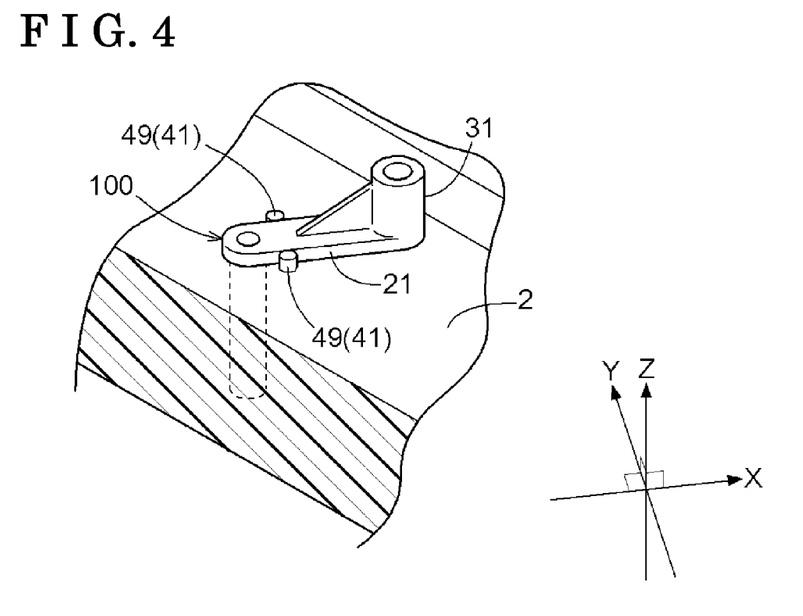
FIG. 4 is a view illustrating a restriction according to another embodiment.

According to the aforementioned embodiment, the restriction portion 41 is explained to include the protrusion 42 and the recess 43. However, the applicability of this invention is not limited to this. For example, as shown in FIG. 4, the restriction portion 41 can be configured by columnar bodies 49 that are standingly provided from the cylinder head cover 1 along the Z direction. In such a case, it is favorable that the arm portion 21 is provided so as to be sandwiched by a pair of the columnar bodies 49 along the Y direction. Even in such a case, the movement of the arm portion 21 relative to the cylinder head cover 2 in the circumferential direction about the connection portion 11 can be restricted.

Figure 5:
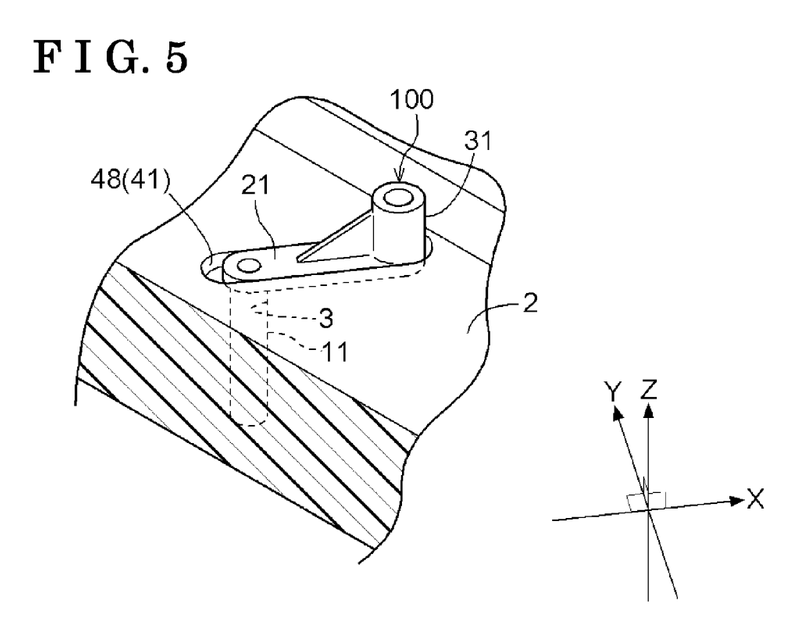
FIG. 5 is a view illustrating another restriction according to still another embodiment.

Alternatively, as shown in FIG. 5, in a case where the connection portion 11 is inserted into the through hole 3 of the cylinder head cover 2, a hole portion 48 can be provided at the cylinder head cover 2 as the restriction portion 41 so that at least a portion of the arm portion 21 in a thickness direction (the Z direction) is embedded in the cylinder head cover 2. Even in such a case, the movement of the arm portion 21 relative to the cylinder head cover 2 in the circumferential direction about the connection portion 11 can be restricted by the hole portion 48 (the restriction portion 41).

According to the aforementioned embodiment, the protrusion 42 is explained to be formed at the extending end 22 of the arm portion 21 and the recess 43 is explained to be formed at the cylinder head cover 2. However, the applicability of this invention is not limited to this. The protrusion 42 can be formed at the cylinder head cover 2 and the protrusion 42 can be formed at the extending end 22 of the arm portion 21. That is, it is favorable that the recess 43 opening towards a side where the cylinder head cover 2 is provided at the extending end 22 of the arm portion 21, and the protrusion 42 being provided at a position of the cylinder head cover 2, the position facing the recess 43, the protrusion 42 being standingly provided from the cylinder head cover 2, is provided. Even in such a configuration, the movement of the arm portion 21 can be restricted by the engagement of the protrusion 42 with the recess 43.

Figure 6:
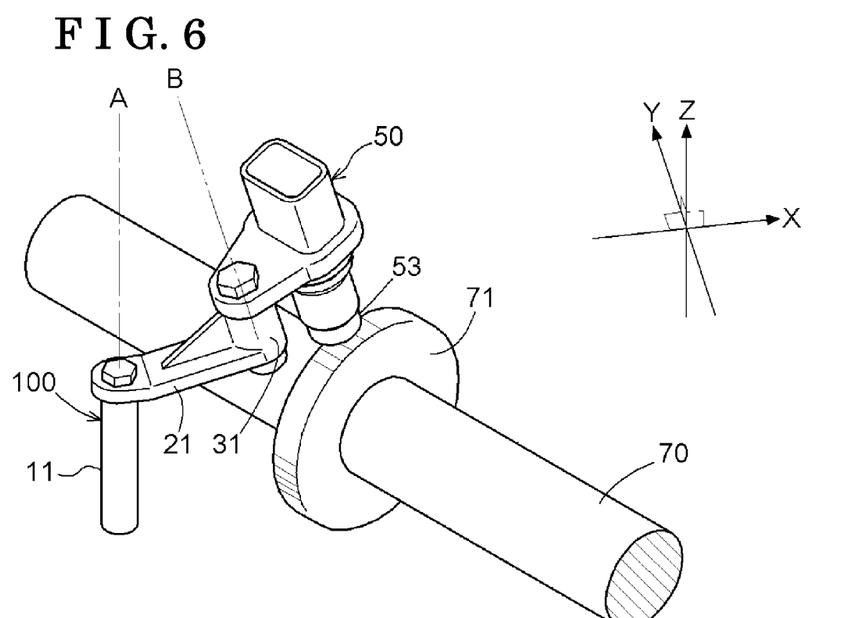
FIG. 6 is a view illustrating a sensor support body according to another embodiment.

According to the aforementioned embodiment, the connection portion 11 and the sensor support portion 31 are illustrated to be formed such that each of the axial direction of the connection portion 11 and the extending direction of the sensor support portion 31 is along the Z direction. However, the applicability of this invention is not limited to this. The connection portion 11 and the sensor support portion 31 can be provided such that the axial direction of the connection portion 11 corresponds to a direction different from the extending direction of the sensor support portion 31, that is, the axial direction of the connection portion 11 is non-parallel to the extending direction of the sensor support portion 31. An example of this configuration is shown in FIG. 6. According to the example in FIG. 6, the axial direction of the connection portion 11 shown in a dashed line A is arranged in parallel with a Z shaft. Meanwhile, the extending direction of the sensor support portion 31 shown in a two-dot chain line B is provided so that the sensor support portion 31 is rotated by a predetermined angle along the circumferential direction of the rotor 71. As such, because the axial direction of the connection portion 11 shown in the dashed line A and the extending direction of the sensor support portion 31 shown in the two-dot chain line B are not parallel with each other, the flexibility in a mounting position of the sensor 50 can be enhanced even in a case where other components are positioned in the vicinity of the mounting position of the sensor 50. Of course, the axial direction of the connection portion 11 can be provided in a non-parallel manner relative to the Z shaft and the extending direction of the sensor support portion 31 can be provided in a parallel manner relative to the Z shaft. Furthermore, each of the axial direction of the connection portion 11 and the extending direction of the sensor support portion 31 can be provided in the non-parallel manner relative to the Z shaft.

According to the aforementioned embodiment, the sensor support body 100 that is provided with the connection portion 11, the arm portion 21, the sensor support portion 31, the rib 32, and the protrusion 42 is explained such that the connection portion 11 is inserted into the through hole 3 of the cylinder head cover 2 and is fixed with the screw 80. That is, the sensor support body 100 is explained to be retrofitted to the cylinder head cover 2. However, the applicability of this invention is not limited to this. In a case where the cylinder head cover 2 is made of resin, a preformed sensor support body can be integrally molded with the cylinder head cover 2 when the cylinder head cover 2 is resin-molded. In such a case, in a case where the cylinder head cover 2 after being integrally molded with the sensor support body is mounted to the cylinder head 1, it is favorable that the cylinder head cover 2 is integrally molded with the sensor support body such that the connection portion 11 comes in contact with the cylinder head 1. Furthermore, even in such a case, the connection portion 11 and the cylinder head cover 2 can be fixed with each other with the screw 80.

Figure 7:
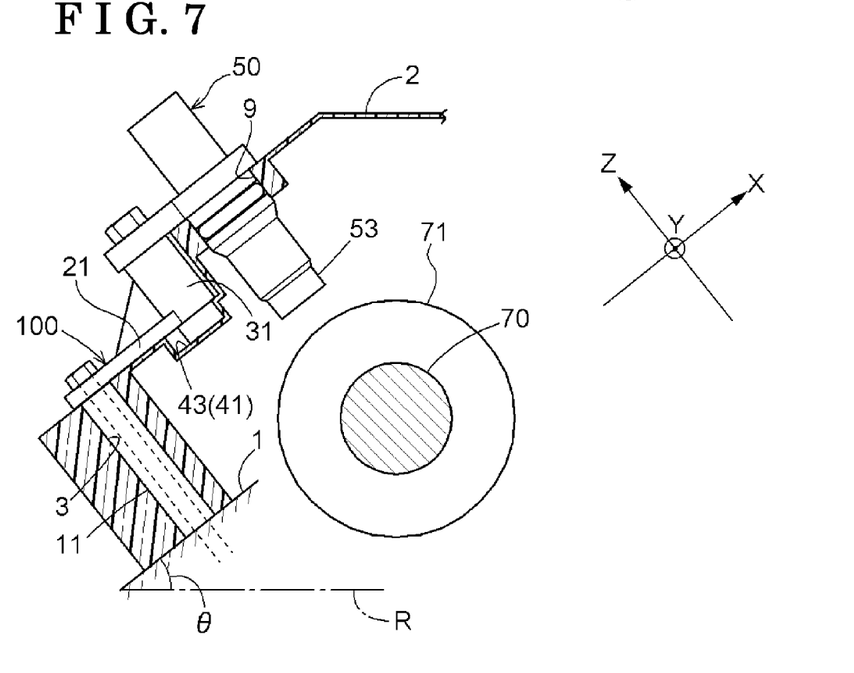
FIG. 7 is a view illustrating another sensor support body according to still another embodiment.

According to the aforementioned embodiment, the connection portion 11 is explained to be provided so as to be in contact with a portion configuring the cylinder head 1 from the outer surface of the cylinder head cover 2. However, a state where the portion configuring the cylinder head 1 being in contact with the connection portion 11 is assembled has not been explained. This indicates that the present invention can be applied irrespective of a state where the portion configuring the cylinder head 1 is positioned. That is, the portion configuring the cylinder head 1 being in contact with the connection portion 11 can be in parallel with a horizontal surface R. Alternatively, as shown in FIG. 7, the portion configuring the cylinder head 1 being in contact with the connection portion 11 can include a predetermined angle 19 relative to the horizontal surface R. Even in such a case, the sensor 50 detecting the rotation of the camshaft 70 can be supported with high precision.

INDUSTRIAL AVAILABILITY

The present invention can be applicable to a sensor support structure that supports a sensor detecting a rotation of a camshaft.

EXPLANATION OF REFERENCE NUMERALS 1 cylinder head
2 cylinder head cover
11 connection portion
21 arm portion
22 extending end
31 sensor support portion
41 restriction portion
42 protrusion
43 recess
50 sensor
70 camshaft
E internal combustion engine

The invention claimed is:

1. A sensor support structure comprising:
a connection portion being positioned in a cylinder head cover of an internal combustion engine from an outer surface of the cylinder head cover to a position where the connection portion comes in contact with a cylinder head of the internal combustion engine;
an arm portion extending from an outer end side of the connection portion toward an outer side of the connection portion in a radial direction;
a sensor support portion being provided at an extending end of the arm portion, the sensor support portion being formed to protrude in a direction away from a side where the cylinder head is positioned, the sensor support portion supporting a sensor that detects a rotation of a camshaft of the internal combustion engine; and
a restriction portion restricting a movement of the arm portion relative to the cylinder head cover in a circumferential direction about the connection portion,
wherein the restriction portion includes
a protrusion being formed at one of the extending end of the arm portion and the cylinder head cover; and
a recess being provided at the other of the extending end of the arm portion and the cylinder head cover, the recess being provided at a position facing the protrusion, the recess being formed in a long-hole shape along an extending direction of the arm portion.

2. A sensor support structure comprising:
a connection portion being positioned in a cylinder head cover of an internal combustion engine from an outer surface of the cylinder head cover to a position where the connection portion comes in contact with a cylinder head of the internal combustion engine;
an arm portion extending from an outer end side of the connection portion toward an outer side of the connection portion in a radial direction;
a sensor support portion being provided at an extending end of the arm portion, the sensor support portion being formed to protrude in a direction away from a side where the cylinder head is positioned, the sensor support portion supporting a sensor that detects a rotation of a camshaft of the internal combustion engine; and
a restriction portion restricting a movement of the arm portion relative to the cylinder head cover in a circumferential direction about the connection portion,
wherein the connection portion is inserted into a connection portion insertion through hole provided in the cylinder head cover,
a portion of the sensor is inserted into a sensor insertion through hole provided in the cylinder head cover, and
the restriction portion includes
a protrusion being formed at one of the extending end of the arm portion and the cylinder head cover; and
a recess being provided at the other of the extending end of the arm portion and the cylinder head cover, the recess being provided at a position facing the protrusion, the recess being formed in a long-hole shape along an extending direction of the arm portion.

3. The sensor support structure according to claim 1, wherein an axial direction of the connection portion is non-parallel to an extending direction of the sensor support portion.

4. The sensor support structure according to claim 2, wherein an axial direction of the connection portion is non-parallel to an extending direction of the sensor support portion.

* * * * *